United States Patent [19]

Wright et al.

[11] Patent Number: 5,282,698
[45] Date of Patent: Feb. 1, 1994

[54] THREADED FASTENER, METHOD OF FABRICATION THEREOF AND METHOD OF SUPPORTING A MINE ROOF USING SUCH A FASTENER

[75] Inventors: Raymond L. Wright, Syracuse; Carl A. Clark, Liverpool, both of N.Y.

[73] Assignee: The Eastern Company, Naugatuck, Conn.

[21] Appl. No.: 893,062

[22] Filed: Jun. 3, 1992

[51] Int. Cl.$^5$ ............................ E21D 20/02; E21D 21/02
[52] U.S. Cl. ........................... 405/259.6; 405/259.16; 411/3; 411/9; 411/39; 470/18; 470/19; 470/26
[58] Field of Search ............... 405/259.1, 259.2, 259.3, 405/259.4, 259.5, 259.6; 411/1, 2, 3, 4, 5, 6, 7, 9, 10, 39, 40; 470/18, 19, 20, 25, 26

[56] References Cited

U.S. PATENT DOCUMENTS

| | | | |
|---|---|---|---|
| 449,659 | 4/1891 | Barrett et al. | 470/19 X |
| 770,022 | 9/1904 | Newhall | 411/39 |
| 2,333,290 | 11/1943 | Brackett | 470/19 X |
| 2,592,129 | 4/1952 | Engstrom | 470/19 |
| 3,142,325 | 7/1964 | Swanstrom | 470/19 X |
| 4,295,761 | 10/1981 | Hansen | 405/259.1 X |
| 4,662,795 | 5/1987 | Clark et al. | 405/259.6 |
| 4,805,288 | 2/1989 | Cosenza et al. | 470/19 X |

Primary Examiner—Dennis L. Taylor
Assistant Examiner—Arlen L. Olsen
Attorney, Agent, or Firm—Charles S. McGuire

[57] ABSTRACT

A threaded fastener and method of fabrication thereof wherein the fastener or nut includes a first portion having external, wrench-engaging surfaces and a central, through bore, internally threaded for at least a portion of its length from a base surface. A wall portion extends integrally from the end of the first portion opposite the base surface, concentrically surrounding and spaced radially outwardly from the end of the bore. The first and wall portions are formed as a metal casting with the wall portion in two segments separated by longitudinally extending, V-shaped notches. The free edges of the wall segments, which initially lie in a plane normal to the axis of the bore, are deformed by a die, moving radially inward so that the wall segments are in a domed configuration with the free edges defining a substantially oval opening having a major axis with a length about equal to the diameter of the bore and a minor axis about 4/5 that of the major axis. A method of supporting a mine roof using such a threaded fastener with a bearing plate, resin cartridge and elongated rod having threads mating with the internal threads of the bore is also disclosed.

19 Claims, 2 Drawing Sheets

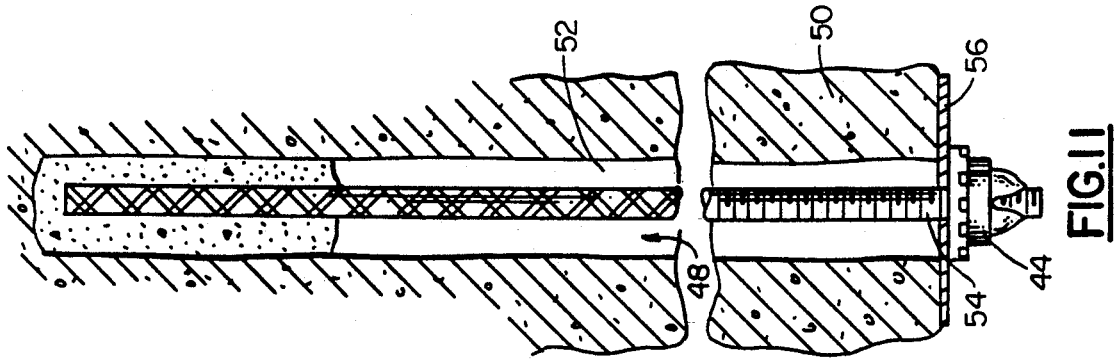
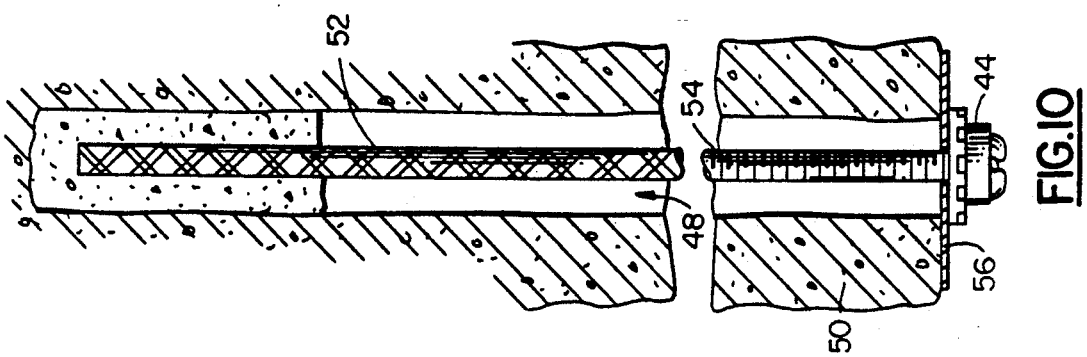
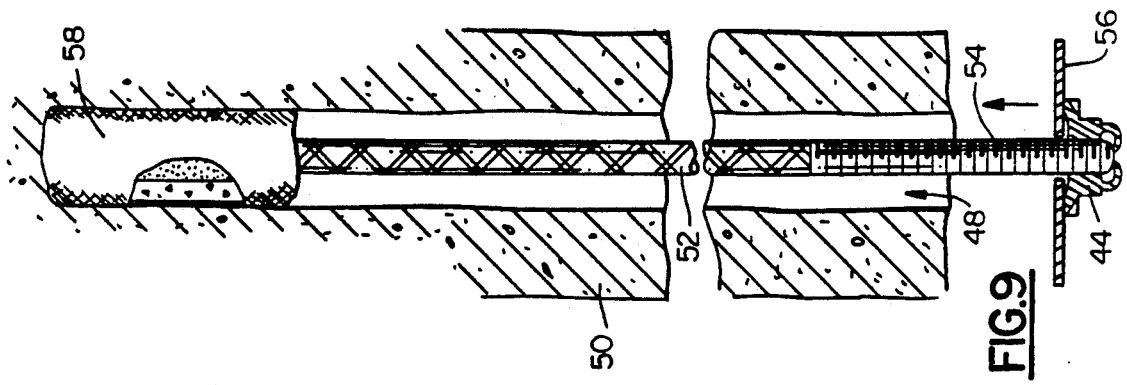
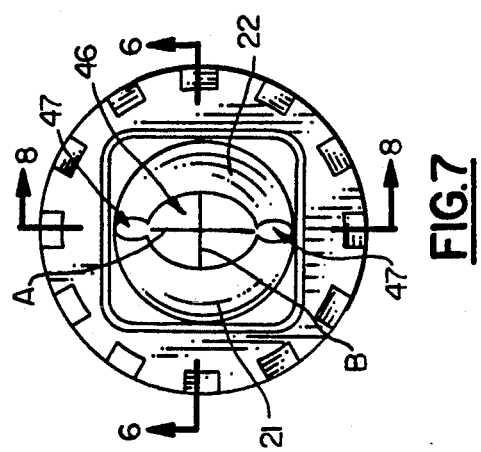
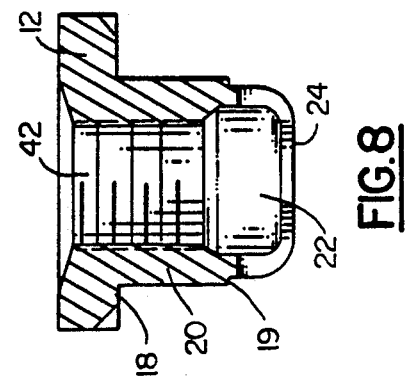

THREADED FASTENER, METHOD OF FABRICATION THEREOF AND METHOD OF SUPPORTING A MINE ROOF USING SUCH A FASTENER

BACKGROUND OF THE INVENTION

The present invention relates to the fields of threaded fasteners and of methods of fabrication thereof, and to installing mine roof support systems using nuts having a portion which is deformable upon application of excess torque.

U.S. Pat. No. 4,662,795 of Clark et al, issued May 5, 1987 and assigned to applicant's assignee, describes a method of supporting and reinforcing a rock structure such as a mine roof utilizing a nut having an internally threaded portion and an integral, domed portion. Fabrication of the nut includes forming a metal casting having through a bore with first and second contiguous portions over its axial length. The first portion is drilled and tapped to provide a threaded portion having a first diameter, less than the diameter of the substantially cylindrical surface of the second portion of the bore. At least a portion of the external surface of the nut outwardly adjacent the threaded portion of the bore is formed with a plurality of flat sides for engagement by a wrench. The external surface outwardly adjacent the second portion of the bore is formed in the casting as substantially cylindrical and is deformed by an appropriate die to a domed configuration having an opening in the top of the dome of smaller diameter than the first diameter.

A first, threaded end of a bolt is inserted through an opening in a conventional bearing plate and threaded into the nut until the end of the bolt contacts the inside of the domed portion about the periphery of the opening. A standard resin cartridge is placed in a bore hole of predetermined depth and diameter in the rock formation, followed by the end of the bolt opposite that engaged with the nut. The cartridge is crushed against the end of the bore hole by advance of the bolt and its contents released.

Rotation of the bolt by a wrench engaged with the nut serves to mix the resin components. Rotation is stopped for a time, usually not more than 10 seconds, to allow the mixed components to harden and thus anchor the bolt within the drill hole. Application of excess torque to the nut, with rotation of the bolt prevented due to its engagement by the hardened resin, causes the end of the bolt to break through the domed portion of the nut. Sufficient torque is applied to thread the nut into secure engagement with the bearing plate and tension the bolt to the desired degree.

Although the above-described method of mine roof support has received large and widespread acceptance throughout the industry, it has been found that the torque required to break the end of the bolt through the domed end of the nut is sometimes excessive. Efforts to alleviate this problem by increasing the size of the opening or decreasing the thickness of the material at the domed end of the nut have not proven effective. When the torque required to break the end of the bolt through the domed end of the nut is not consistently at or near the desired level, reliability of operation and integrity of the anchorage are threatened.

Accordingly, it is a principal object of the present invention to provide a novel and improved threaded fastener in the nature of a domed nut, and a method of fabrication thereof, for use with conventional elongated bolts, bearing plates and resin cartridges in mine roof support systems.

Another object is to provide a method of supporting and reinforcing a mine roof utilizing a threaded bolt, a bearing plate, a resin cartridge and a domed nut wherein the torque required to cause the end of the bolt to break through the domed end of the nut is consistent, at a level less than that required for prior art systems of the same general type.

Other objects will in part be obvious and will in part appear hereinafter.

SUMMARY OF THE INVENTION

The threaded fastener of the present invention is formed as a metal casting having a through bore with first and second axial portions. The first portion of the bore is later drilled and tapped to provided a threaded opening of first diameter for mating with external threads on a bolt of that diameter. At least a portion of the external surface surrounding the threaded opening has a plurality of flat sides for engagement by a wrench. The second portion of the bore is substantially cylindrical, having a second diameter, larger than the first diameter. The wall or flange surrounding the second portion of the bore is formed in two segments, separated by a pair of notches or gaps, diametrically opposite one another, which are progressively wider from the junction of the wall with the wrench-engagement portion to the free edges of the casting, which lie in a plane perpendicular to the bore and are spaced by the wide ends of the notches. The notches are substantially V-shaped with linear edges and the apex rounded at a relatively small radius.

When the wall portion is deformed by a hemispherical die to a substantially domed shape, the free edges of the wall segments are moved inwardly until the corners at the open ends of the notches are in adjacent, contacting or closely-spaced relation. The opening defined by the free edges of the wall is of oval shape, having a major axis which is substantially equal to the diameter of the threaded opening and a minor axis about 4/5 of the major axis. The openings formed by the edges of the notches after the dome is formed are also substantially oval, with edges curved in two planes and a minor axis about ⅓ the length of the major axis. As a further feature, the wrench-engaging portion of the nut's external surface extends past the internally threaded portion of the bore, with the apex of the V-shaped notches flush with the wrench-engaging surface on the exterior, but spaced from the threaded portion of the bore on the interior.

The foregoing and other features of the threaded fastener, its method of fabrication, and the method of mine roof support employing such a threaded fastener will be more readily understood and fully appreciated from the following detailed description, taken in conjunction with the accompanying drawings, wherein:

BRIEF DESCRIPTION OF THE DRAWINGS

FIG. 7 is a top plan view of the finished nut;

FIG. 8 is an elevational view in section on the line 8—8 of FIG. 7; and

FIGS. 9-11 are a series of sectional, elevational views of a rock structure illustrating steps in the method of the present invention of installing a mine roof support and reinforcing system utilizing the nut of FIGS. 5-8.

DETAILED DESCRIPTION

Figure 1:
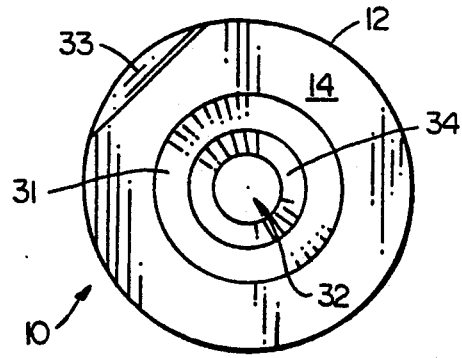
FIG. 1 is a bottom plan view of the metal casting from which the threaded fastener of the invention is fabricated.
Figure 4:
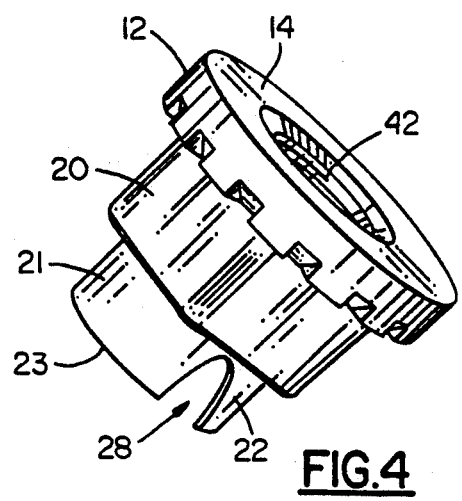
FIGS. 4 and 5 are perspective views of the casting after drilling and tapping, and after forming of the domed portion, respectively.
Figure 2:
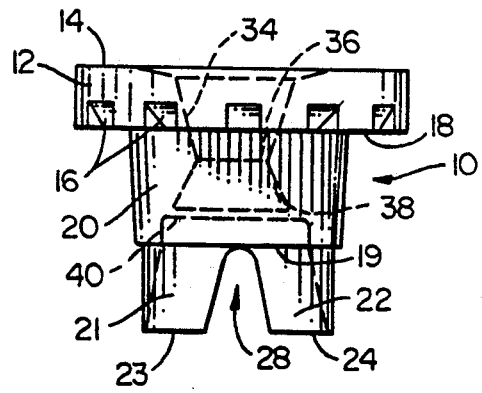
FIG. 2 is a side elevational view of the casting.
Figure 5:
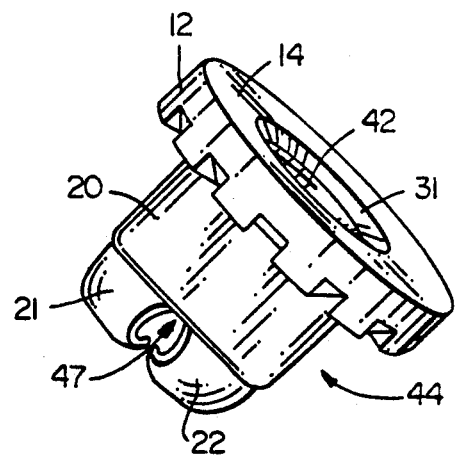
Figure 3:
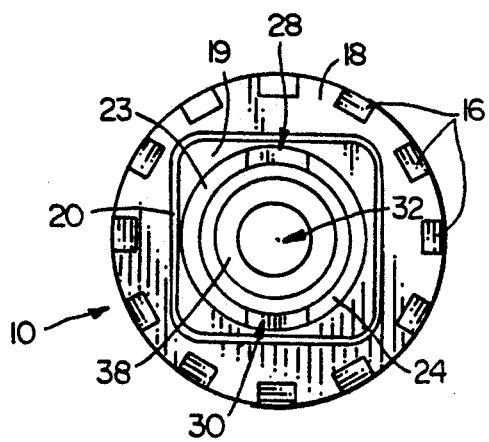
FIG. 3 is a top plan view thereof.
Figure 6:
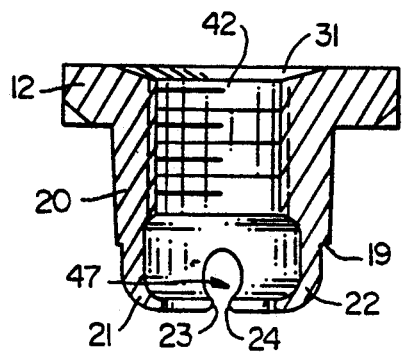
FIG. 6 is an elevational view of the finished nut in section on the line 6—6 of FIG. 7.

The first step in fabricating the nut element of the invention is the forming of a metal casting. The casting, preferably of malleable iron, is formed by conventional metal casting techniques and is shown in FIGS. 1-3, denoted by reference numeral 10. Casting 10 includes cylindrical base portion 12 having base surface 14. Notches 16 may be formed in the peripheral edge bounding surface 18, opposite the base surface, from which body portion 20 extends. Body portion 20 is formed with a plurality of flat sides, four in the illustrated embodiment, for engagement by a wrench, and extends from base portion 12 to terminal surface 19.

A flange or wall portion is formed in two substantially semi-cylindrical segments 21 and 22, extending integrally from a junction with terminal surface 19 to free edges 23 and 24, respectively. Wall segments 21 and 22 are separated by V-shaped notches 28 and 30 which are formed in diametrically opposite sides of casting 10. The apex or narrow end of each of notches 28 and 30 is substantially flush with surface 19 and is preferably curved about a relatively small radius. Free edges 23 and 24 are separated by the wide ends of notches 28 and 30, the side edges of which are linear. In a preferred configuration, the wide ends of notches 28 and 30 are spaced by a distance about 3/8 of the outside diameter of wall segments 21 and 22.

Casting 10 is formed with a through bore 32, surrounded by base and body portions 12 and 20 and wall segments 21 and 22, using a conventional green sand mold providing portion 34 (FIGS. 1 and 2), tapering inwardly from base surface 14 to internal parting line 36 (FIG. 2), and portion 38 (FIGS. 2 and 3), tapering outwardly from parting line 36 to junction 40 (FIG. 2). Bore 32 tapers outwardly from junction 40, through a portion of body portion 20 and through wall segments 21 and 22, to free edges 23 and 24. Minimal draft angles, e.g., 1°, are used in forming the external surfaces of base and body portions 12 and 20, and wall segments 21 and 22. Thus, wall segments 21 and 22 are somewhat thinner at free edges 23 and 24 than at their junction with surface 19. Also, shallow, conical chamfer 31 is provided in base surface 14 around the opening of bore 32, and chamfer 33 is provided for gating purposes in the casting procedure.

After forming, casting 10 is annealed to provide the necessary hardness, and portions 34 and 38 are drilled and tapped to provide internally threaded portion 42 for mating with external threads of a particular diameter and pitch on an elongated rod of the anchoring system. Wall segments 21 and 22 are then deformed to a generally domelike configuration by means of a hemispherical die (not shown) having a controlled stroke, moving free edges 23 and 24 radially inwardly. In such deformation, the corners of free edges 23 and 24 on opposite sides of the wide ends of notches 28 and 30 are moved toward each other. When deformation is complete, these corners are in contacting or closely spaced relation, and notches 28 and 30 are essentially oval in shape, the initially linear edges now being curved in two planes. The element may then be pearlitized by further heat treatment.

The completed nut element is shown in FIGS. 5-8, denoted by reference numeral 44, other reference numerals being the same as those used for corresponding portions of casting 10. As seen in FIG. 7, free edges 23 and 24 of nut 44 define a substantially oval opening, indicated by reference numeral 46, having major and minor axes A and B, respectively. In the preferred embodiment, axis B has a length about 4/5 that of axis A. Also, the initially straight edges of notches 28 and 30 are deformed to define substantially oval openings 47, the major axes of which are curved and the minor axes being about one third of the length of the major axes. As seen in FIG. 8, the exterior, terminal surface 19 of body portion 20 extends beyond the adjacent threaded portion 42 of the bore. The curved apexes of notches 28 and 30 are substantially flush with surface 19, but are spaced from the terminus of threaded portion 42. This ensures that as wall segments 21 and 22 are deformed, the threads are not affected.

Turning now to FIGS. 9-11, the method of installing a mine roof anchoring system utilizing nut element 44 is illustrated. Bore hole 48 is drilled to predetermined diameter and depth in rock strata 50, such as a mine roof. Elongated rod 52, of conventional rebar, has threads 54 extending for a portion of its length from a proximal end which extends through an opening in bearing plate 56 and is threadedly engaged with nut 44 so that the proximal end of the rebar contacts the inside of the domed portion of the nut. The distal end of rod 52 is inserted in bore hole 48 behind conventional, two-part resin cartridge 58. The lengths of rod 52 and cartridge 58 are such, relative to the depth of bore hole 48, that the cartridge is crushed and its components released by advancement of the rod to engage bearing plate 56 with the surface of rock strata 50, as in FIG. 10.

The length of minor axis B of opening 46 is less than the diameter of threaded portion 42 of nut 44, and thus of the threaded portion of rod 52. The length of major axis A may be about the same as the diameter of threaded portion 42. Body portion 20 is engaged by a power wrench and rotated with the elements in the positions of FIG. 10. Since the proximal end of rod 52 cannot pass through opening 46, rotation of nut 44 in the direction tending to advance the nut on threads 54 is transmitted to rod 42 and resin components surrounding a portion of the rod extending from its distal end are mixed by such rotation. Rotation is stopped for a time, usually only a few seconds with most modern resins, to allow the mixed components to harden sufficiently to effectively prevent further rotation of rod 52. A torque in excess of that required to cause the proximal end of rod 52 to spread edges 23 and 24 and pass through opening 46 is then applied to nut 44. This permits nut 44 to advance on threads 54 and tension rod 52 to a desired degree, thereby urging bearing plate 56 into supporting engagement with the surface of rock strata 50 and reinforcing the strata. If desired, the distal end of rod 52 may also be threaded and carry a conventional mechanical expansion anchor (not shown) to provide a combined mechanical-chemical anchor. The mechanical anchor is set and the resin mixed by rotation of nut 44 and rod 52 as described above, and excess torque may be applied to tension the rod without waiting form the resin to harden.

The configuration of nut 44, fabricated and utilized in a roof support anchoring according to the above described methods, ensures a consistent break-through torque lower than that of comparable prior art systems, and thus a more easily installed and reliable anchor. In an embodiment for use with a bolt having a thread diameter of ¾", the preferred axial length of casting 10 (from the parallel planes of base surface 14 to free edges 23 and 24) is 1.375", the axial length of wall segments 21 and 22 of the casting is 0.4375, and the spacing of the free edges at the open ends of notches 28 and 30 is 0.375". The thickness of wall segments 21 and 22 is 0.273" at their juncture with surface 19 and 0.148" at free edges 23 and 24. The major and minor axes of opening 46 are about 0.75" and 0.60", respectively.

What is claimed is:

1. The method of fabricating a threaded fastener for use with an externally threaded rod of predetermined diameter, said method comprising:
    a) forming a metal casting having a planar base surface and a through bore substantially concentric about a central axis normal to said base surface, said casting having an exterior surface configuration extending axially from said base surface at least a portion of which has a terminal surface parallel to said base surface and includes a plurality of planar, wrench-engaging surfaces arranged concentrically about and parallel to said central axis, said casting further including a substantially cylindrical wall portion extending integrally from said terminal surface concentrically about said central axis, said wall portion having at least two segments separated by substantially V-shaped notches each having pairs of opposing edges extending from apexes substantially at said terminal surface to open ends separating coplanar free edges of said wall portion;
    b) drilling an axial portion of said bore extending substantially from said base surface to a predetermined axial position to substantially said predetermined diameter;
    c) forming internal threads in said axial portion for mating engagement with said rod; and
    d) deforming said wall portion by moving said free edges radially inwardly to a position wherein said wall portion assumes a substantially domed shaped, each of said pairs of opposing edges define first, substantially oval openings, and said free edges define a second, substantially oval opening having a minor axis with a length less than said predetermined diameter.

2. The method of claim 1 and further comprising annealing said casing prior to said drilling step.

3. The method of claim 1 and further comprising forming said wall portion of said casting with a thickness which is greater at the juncture of said wall portion with said terminal surface than at said free edges.

4. The method of claim 3 wherein said wall portion is formed with an external surface of substantially uniform diameter throughout the axial length of said wall portion, and an internal surface which tapers outwardly at a relatively small, uniform angle throughout the axial length of said wall portion.

5. The method of claim 1 wherein the number of each of said wall segments and said first openings is two, said notches being positioned on diametrically opposite sides of said wall portion.

6. The method of claim 5 wherein said notches are formed with said open ends providing a spacing of said free edges, prior to said deforming step, equal to about ⅜ of the outside diameter of said wall portion.

7. The method of claim 6 wherein the major axis of said second oval opening has a length substantially equal to said desired diameter.

8. A threaded fastener comprising:
    a) a first portion having parallel, planar, base and terminal surfaces and an external surface extending longitudinally between said base and terminal surfaces;
    b) an open bore having a central axis and predetermined diameter extending through said first portion, said bore being internally threaded for at least a portion of its length extending from said base surface;
    c) at least a portion of said external surface comprising a plurality of planar surfaces parallel to and symmetrical about said central axis; and
    d) a wall portion having a plurality of circumferentially spaced segments extending integrally from said terminal surface in encircling, outwardly spaced relation to the end of said bore, the segments of said wall portion being symmetrically arranged about said central axis in a substantially dome-shaped configuration, said segments having substantially smooth, unthreaded, internal and external surfaces, and free edges collectively defining a substantially oval opening co-axial with said central axis and having a minor axis with a length less than said predetermined diameter, whereby an externally threaded member advanced through said bore is restrained from further threaded advance by contact with portions of said wall portion segments bordering said oval opening, said wall portion being so formed that application of a predetermined relative torque to said threaded fastener and threaded member deforms said wall portion to widen said oval opening and permit said threaded member to pass therethrough in the absence of threaded engagement with any part of said wall portion.

9. The threaded fastener of claim 8 wherein said first portion comprises a base portion and a body portion, said base portion extending from said base surface to a junction with said body portion, and said body portion extending from said junction to said terminal surface, said base portion having a substantially cylindrical outer surface and said body portion having an external surface including said planar surface.

10. The threaded fastener of claim 9 wherein said oval opening has a major axis having a length substantially equal to said predetermined diameter.

11. The threaded fastener of claim 9 wherein the minor axis of said oval opening is about 4/5 of the major axis thereof.

12. The threaded fastener of claim 9 wherein the number of said segments is two and said segments are separated by second and third substantially oval openings having edges curved in two planes.

13. The threaded fastener of claim 12 wherein said second and third oval openings are positioned on diametrically opposite sides of said central axis.

14. The threaded fastener of claim 13 wherein said second and third oval openings are substantially identical and have minor axes equal to about ½ of their major axes.

15. The threaded fastener of claim 13 wherein said second and third oval openings extend from said terminal surface to said free edges.

16. A method of supporting a mine roof and reinforcing the surrounding rock strata comprising:
   a) drilling a hole of predetermined depth into said mine roof;
   b) forming an elongated, metal rod having external threads extending from one end thereof for at least a portion of its length;
   c) extending said threaded rod end through an opening in a bearing support plate;
   d) forming a unitary nut element having an internally threaded opening extending from one side thereof through a first portion, and further having a wall portion having a plurality of circumferentially spaced segments extending integrally from said first portion in encircling, outwardly spaced relation to said threaded opening in a dome-shaped configuration to free edges collectively defining a substantially oval opening axially spaced from and having a minor axis smaller than said threaded opening and coaxial therewith; and
   e) threadedly advancing said rod completely through said threaded opening until said one end of said rod contacts said dome-shaped portion about an interior surface of said oval opening;
   f) inserting a resin cartridge containing two components in separate compartments into said drill hole;
   g) inserting the end of said rod opposite said one end into said drill hole behind said resin cartridge and advancing said rod into said drill hole, said rod having a length so related to said predetermined depth and the size of said cartridge that the latter is broken by advance into said drill hole, thereby releasing the components of said cartridge;
   h) engaging said nut element with a wrench and imparting rotation to said nut element and thereby to said rod to mix said components, thereby initiating hardening of the resin mix;
   i) rotationally fixing the position of said rod within said drill hole;
   j) applying a torque to said nut element sufficient to cause said oval opening to widen and allow said one end of said rod to pass therethrough without threaded engagement with said wall portion segments to permit threaded advance of said nut element on said one end of said rod; and
   k) tensioning said rod to a desired degree by application of a predetermined torque to said nut element.

17. The method according to claim 16 wherein said nut element is formed as an integral, one-piece member from a metal casting.

18. The method according to claim 17 wherein said metal casting is of malleable iron.

19. The method according to claim 17 wherein said wall portion is formed in said metal casting in two segments separated by substantially V-shaped notches on diametrically opposite sides of said nut element.

* * * * *